Nov. 8, 1938. J. J. SPANDORFER 2,136,326

BOOK MARKER

Filed May 26, 1937

Joseph J. Spandorfer
INVENTOR
BY Victor J. Evans & Co.
ATTORNEYS

Patented Nov. 8, 1938

2,136,326

UNITED STATES PATENT OFFICE 2,136,326

BOOK MARKER

Joseph J. Spandorfer, Norfolk, Va.

Application May 26, 1937, Serial No. 144,942

1 Claim. (Cl. 116—119)

The invention relates to a book marker and more especially to a page identifier for use with books or the like.

The primary object of the invention is the provision of a marker of this character, wherein the same when applied to a book or the like will identify a page thereof, the pointer or finger thereof, being yieldable, can be readily displaced as to not conceal the reading matter upon the page when in the act of reading the same and due to the outward inherent springy action of the marker on the opening of the book at the point of the identified page, the said marker can be easily grasped for its displacement relative to such page.

Another object of the invention is the provision of a marker of this character, wherein the same is clipped to the book so that a determined page thereof can be readily ascertained or identified with dispatch and on opening of such book the marker can be readily swung or moved out of the path of the page identified thereby for the turning of such page or pages of the book as may be required.

A further object of the invention is the provision of a marker of this character, wherein the construction thereof is novel in its entirety and is readily and easily applied to or removed from a book or the like and when applied will identify any particular page thereof.

A still further object of the invention is the provision of a marker of this character, which is simple in construction, thoroughly reliable and efficient in operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
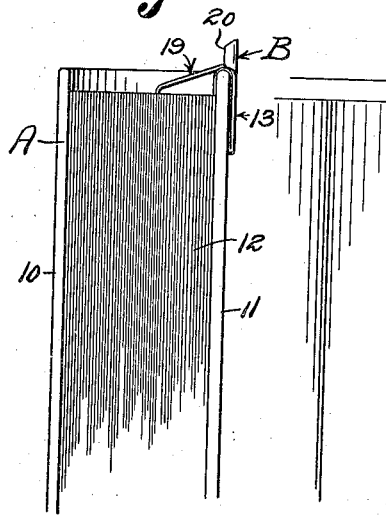
Figure 1 is a fragmentary elevation of a book showing the marker constructed in accordance with the invention applied thereto, the book being closed.

Referring to the drawing in detail, A designates generally a portion of a book having the front and rear covers 10 and 11, respectively, and the leaves 12 included therebetween, the book in its construction or make-up is standard.

The book marker constituting the present invention comprises a clip B preferably made from a sheet metal blank cut and bent to provide an inherently resilient double-jawed body 13, the jaws 14 and 15 being spaced from each other and normally converge in the direction of the entrance end 16 of said body 13. It is preferable to have the jaw 15 slightly longer than the jaw 14 which latter rearwardly thereof is provided with a back attaching ear or extension 17 adapted to project beyond the closed end of the body 13 for a purpose presently described.

Figure 2:
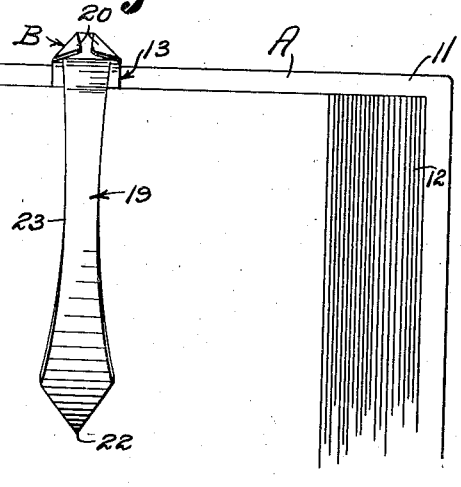
Figure 2 is a fragmentary elevation showing the book open and the marker applied for identifying a particular page of such book.
Figure 3:
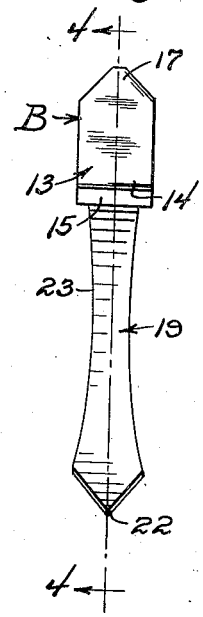
Figure 3 is an elevation of the marker detached from the book.
Figure 4:
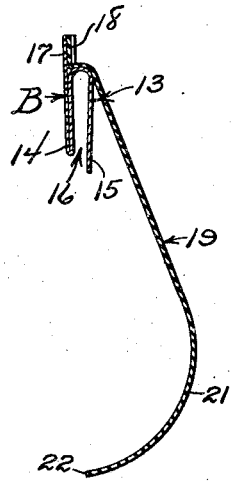
Figure 4 is a sectional view on the line 4—4 of Figure 3 looking in the direction of the arrows.
Figure 5:
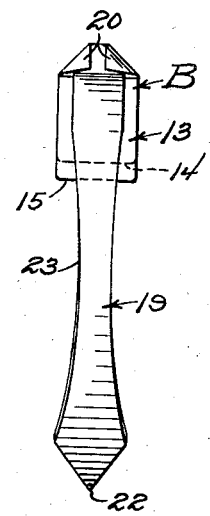
Figure 5 is a view similar to Figure 3 looking toward the opposite side of the marker.

Overlying the jaw 15 of the body 13 and extended onto the ear 17 is the end portion 18 of a marker finger or pointer 19, the ear 17 outwardly of the closed end of the body 13 has its corners folded forwardly and inwardly onto the end portion 18 of the finger or pointer 19 and pinched against the same for effecting overlapped fastener lips 20 for the said finger or pointer 19 and in this manner the latter is attached to the clip B so that it will overlie the jaw 15 of the said clip. This finger or pointer 19 is inherently resilient for the flexing thereof and is normally outwardly bowed at 21 between the end portion 18 and the pointed tip or terminal 22 thereof. This normal outwardly bowed formation and the inherent resiliency of the finger or pointer 19 effects the outward arching of the same from the face of a page 12 of the book A when the latter is open yet such portion 21 of the finger or pointer 19 upon the closing of the book A becomes flattened out between adjacent pages when the marker is applied as shown in Figures 1 and 2 of the drawing.

In the applying of the marker the clip B is engaged over the front or rear cover 10 or 11 and the finger or pointer 19 is brought into an overlapping relation to a particular page to be identified thereby and when the book is open this pointer or finger 19 will be disposed in a separated bridged relation to the page. In other words, the marker when identifying a particular page of the book and the latter open, is arched thereto thus minimizing concealment of reading matter upon the page which would be the case if the finger or pointer 19 lay against and in contacting relation thereto. On the closing of the book with the marker in position for identifying a particular page thereof the said finger or pointer 19 flattens without effecting any material bulge in the book or the undue spreading apart of the pages of such book as the portion 21 of the finger or pointer lies flat between pages adjacent to each other of the book when closed.

The marker can be clipped to the top, bottom or the side edges of the cover section of the book and such pointer or finger 19 can be swung outwardly when carried by the book so as to permit the turning of the pages at will without interference by the marker.

The pointer or finger 19 is preferably shaped to be relatively narrow at the intermediate portion and slightly flared at opposite ends thereof, the narrower portion being indicated at 23.

What is claimed is:

A marker of the kind described comprising an inherently resilient partially outwardly bowed indicator finger having a narrowed portion intermediate the ends thereof and being free of surface protuberances, a clip at one end of the finger for fastening it in an identifying position on a book or the like with respect to a page thereof and the flattening of said finger on the closing of said book, a plate-like portion on said clip, ears folded from the plate-like portion at the outermost corners thereof for the fastening of the end of the finger next thereto, and spaced opposed jaws formed with the clip and having the finger turned closely about one of said jaws.

JOSEPH J. SPANDORFER.